Arthur A. Kroetch
INVENTOR.

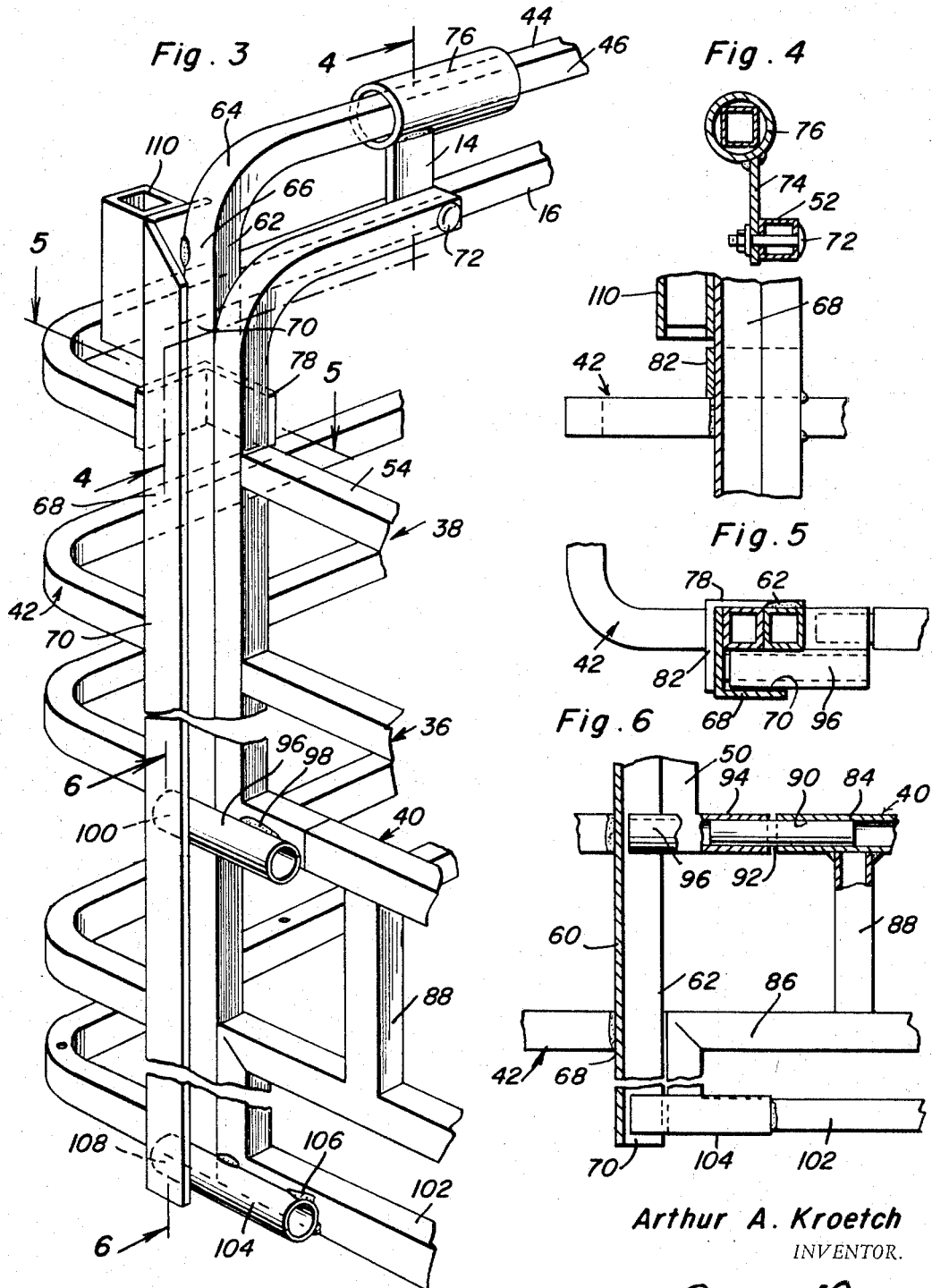

United States Patent Office 3,428,359
Patented Feb. 18, 1969

3,428,359
BODY CONVERSION AND TAILGATE ASSEMBLY FOR A LOAD SUPPORTING BODY
Arthur A. Kroetch, P.O. Box 256,
Philip, S. Dak. 57567
Filed Nov. 2, 1966, Ser. No. 591,561
U.S. Cl. 296—10       8 Claims
Int. Cl. B60p *3/42;* B62d *25/00;* E05d *15/16*

ABSTRACT OF THE DISCLOSURE

A side and end wall extension assembly adapted for attachment to and to comprise upward extensions for the side and front end walls of a pickup truck load bed. The assembly includes a pair of opposing sidewalls having integral laterally inwardly directed end wall sections at one pair of corresponding ends removably joined at their adjacent ends forming an end wall for the assembly rigidly interconnecting the sidewalls of the assembly, the other pair of corresponding ends of the sidewalls of the assembly including laterally inwardly directed partial end walls spaced apart at their adjacent ends defining an opening therebetween and the assembly further including a closure gate for the opening removably positionable in a position supported from the sidewalls of the assembly and closing the opening defined between the spaced apart ends of the partial end walls of the assembly.

---

This invention generally appertains to improvements in load supporting bodies for trucks, particularly open top supporting bodies such as provided on pickup trucks or the like and more particularly relates to a novel body conversion and tailgate assembly for the load supporting body of a pickup truck or the like so as to convert the load supporting body of such truck for other uses, particularly, for hauling or transporting livestock.

The provision of rack structures which are mounted on the walls of an open top load supporting body, such as the load supporting body of a pickup truck, whereby the truck is converted into a haulage vehicle or van for transporting livestock, is well known. However, such known rack constructions are unduly structurally complicated and are extremely difficult to assemble and disassemble and are not reliable in mounted relationship, both structurally and functionally, with the load supporting body of a pickup truck or the like, particularly in the hauling of livestock. In addition, such known utility rack constructions require the expenditure of time and considerable labor, usually by several persons, in assembling and disassembling them. Furthermore, such known rack constructions have the major drawback that they are not equipped or provided with a tailgate or rear end wall assembly which can be easily moved from a perpendicular closed position to an open position for the easy and non-injurious movement of livestock into and from the load supporting body of the truck.

Accordingly, an important object of the present invention is to provide a very simple and compact body conversion assembly, whereby the load supporting body of a pickup truck or any truck of that nature, which has an open top load supporting body, is converted into a van or vehicle for hauling livestock, without injury to the livestock and in a secure and dependable manner and without frightening the livestock.

Ancillary to such object, it is another important object of the present invention to provide a body conversion assembly or rack construction with a novel upwardly acting rear tailgate or end wall assembly, which can be raised by one person in a smooth and effortless manner from a closed, vertical position into a raised horizontal position and which is so structurally related with the sides of the rack construction or body conversion assembly that when in its vertical position, it will structurally coact therewith so as to form a sturdy and dependable enclosure and which when in its raised position, into which position it can be effortlessly moved, will leave the read end entirely open and unobstructed for the free, easy and non-injurious movement of livestock into and from the load supporting body.

Another important object of the present invention is to provide a compact, simple and extremely efficient body conversion assembly or rack construction which can be assembled and disassembled by one person and to provide a tailgate or read end wall assembly, which can be easily raised from a vertical position into a horizontal open position.

Another important object of the present invention is to provide a novel guide and support means in coaction, structurally and functionally, between an upwardly acting rear end wall assembly or tailgate assembly and the opposing sides of a conversion rack or body for the load supporting body of a pickup truck or the like.

A still further important object of the present invention is to provide a novel end gate or rear end wall assembly, which functions in its lowered, vertical position as a sturdy end wall in association with the front end wall and opposing side walls of the conversion rack or body assembly and which can be raised, by virtue of a simple guide and support means, structurally coactive between the rear end wall or end gate assembly and the opposing sides of the conversion rack or body into a completely horizontal position, thereby leaving the rear end of the conversion rack or body completely open and exposed and without any projections or the like so that livestock can be easily moved into and from the load supporting body.

Another important object of the present invention is to provide a simple, efficient and sturdy conversion rack or body, whereby an open top supporting body of a truck, such as a pickup truck, can be converted into a haulage van for livestock or converted for other purposes, which require that the permanent side and end walls of the pickup truck be disposed at a height which is much higher than normal.

These together with other objects and advantages which will become subsequently apparent reside in the detials of construction and operation as more fully hereinafter described and claimed, reference being had to the accompanying drawings forming a part hereof, wherein like numerals refer to like parts throughout, and in which:

FIGURE 3 is a fragmentary perspective view on an enlarged scale showing in detail the guide and support means for the tailgate or rear end wall assembly;

FIGURE 4 is a detailed, longitudinal vertical sectional view, taken substantially on line 4—4 of FIGURE 3;

FIGURE 5 is a detailed horizontal cross-sectional view, taken substantially on line 5—5 of FIGURE 3, and, FIGURE 6 is a detailed vertical sectional view taken substantially on line 6—6 of FIGURE 3.

Figure 1:
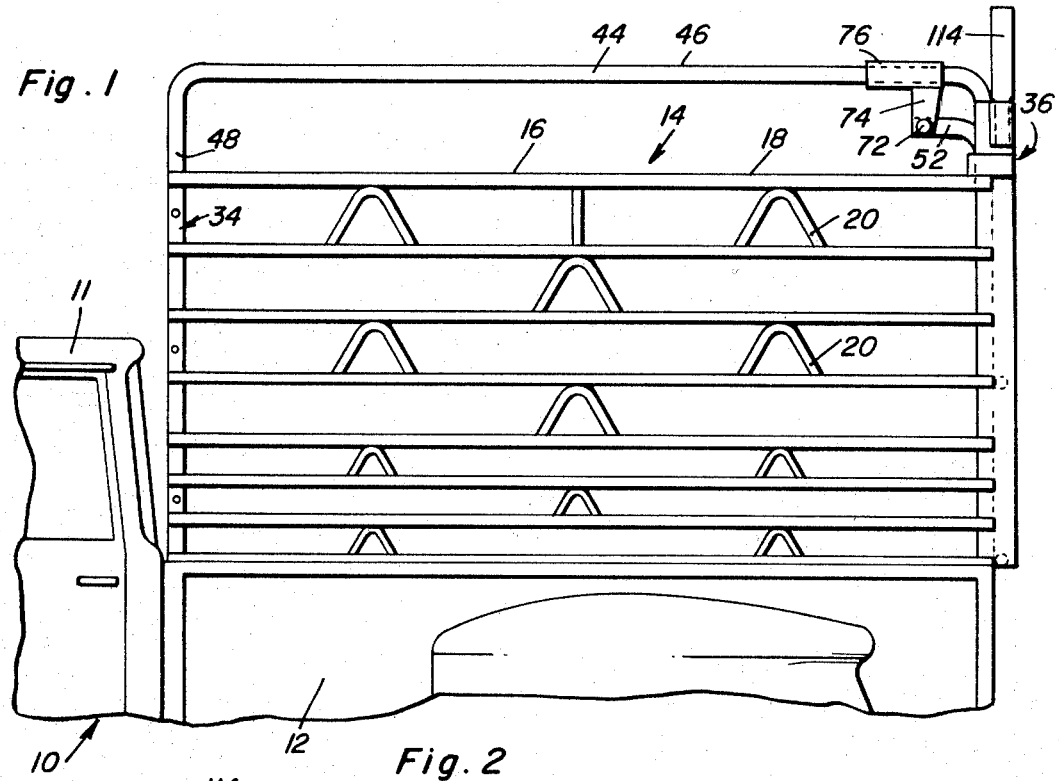
FIGURE 1 is a fragmentary side elevational view of a pickup truck showing in side elevation a conversion rack or conversion body assembly, constructed in accordance with the principles of the present invention, and mounted on the load supporting body of the pickup truck.
Figure 2:
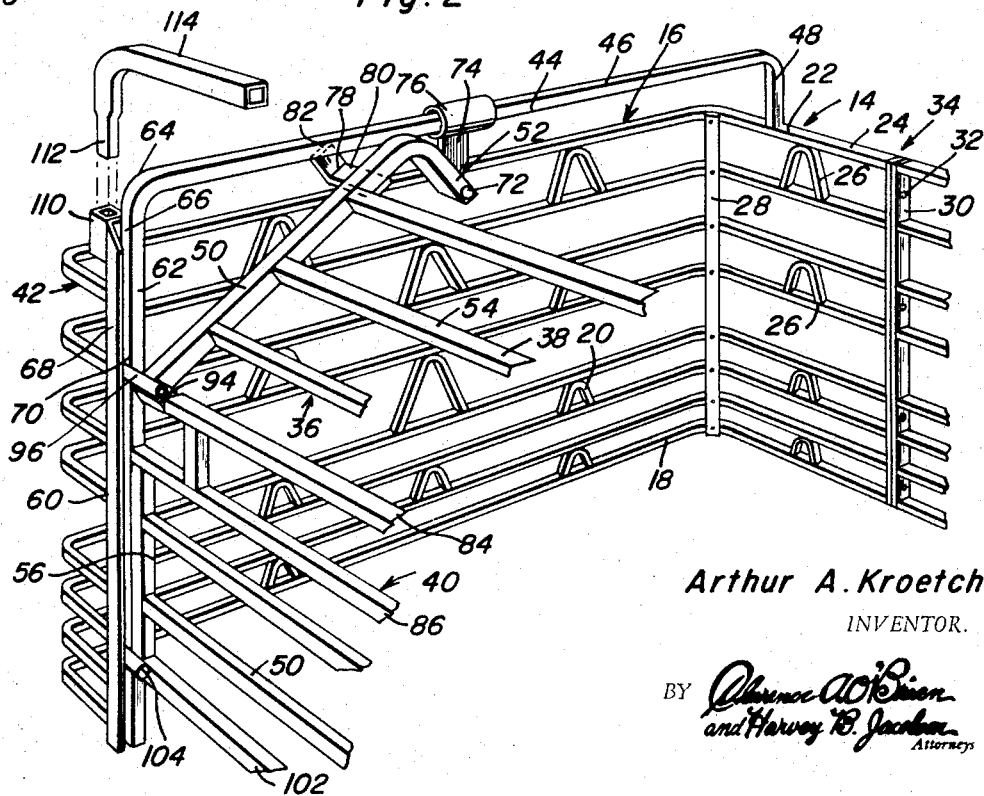
FIGURE 2 is a fragmentary perspective view of a portion of the conversion rack or body and showing the movable rear end wall or tailgate assembly in a semi-open position.

Referring now more particularly to the accompanying drawings and, initially to FIGURES 1 and 2, the reference numeral 10 generally designates a conventional pickup truck, which has an open top load supporting body 12. Such load supporting body 12 is of conventional construction and is disposed behind the cab 11 with its side and end walls being of a relatively slight height and formed in conventional fashion.

The primary aim and purpose of the present invention is to convert the load supporting body 12 into a van for hauling livestock, such as horses, or to convert the load supporting body 12 so that it may serve other purposes, which it cannot serve because of the relatively small height of the wall structure thereof.

Consequently, it is proposed to provide a conversion rack or body assembly 14, which is adapted to be mounted on the end walls and side walls of the load supporting body 12 so as to give elevation thereto, as shown in FIGURE 1. The body conversion assembly or conversion rack 14, as shown more particularly in FIGURE 2, is composed of three components, which renders it extremely easy for one person to assemble and disassemble the same and position it securely on the upper edges of the wall structure of the load supporting body 12. The conversion body or rack 14 includes opposing sides 16, one of which is shown in FIGURE 2. The sides 16 are formed from longitudinally extending, parallel and vertically spaced tubular bars 18, which are interconnected at staggered points by rigidifying straps 20. The sides 16 have forward integral right angularly related, laterally inturned front wall half sections 22.

The front wall half sections 22 are formed integral with the opposing sides 16 with the horizontal bars 24 thereof integral with the bars 18 and disposed in vertically spaced parallel relationship and reinforced by rigidifying straps 26. The inside of the corner between each side 16 and the corresponding front wall half section 22 is rigidified by a corner bar 28. The front wall half sections 22 have vertical end bars 30, which are joined together by fasteners 32 so as to form the complete front end wall 34. Therefore, in assembling the rack or conversion body 14, it is only necessary to bolt the bars 30 together by the bolt assemblies 32 and this provides a rigid structure composed of a rigid front wall 34 and opposing rigid side walls 16.

The conversion rack or body includes a third component, namely, an upwardly shiftable rear end wall assembly or rear tailgate 36, which is illustrated more particularly in FIGURES 2 through 6. As shown in FIGURE 2, the rear wall or tailgate assembly 36 includes upper and lower sections 38 and 40 which are hingedly connected together and which cooperate, in their aligned vertical relationship to form a fixed and sturdy rear end wall for the conversion rack or body and which can be raised from such position into a completely horizontal open position, as will be explained.

The rear ends of the bars 18 of the sides 16 are laterally inturned to provide short, fixed outer rear end sections 42, which parallel the front wall 34.

At each side of the conversion rack or body a guide bar 44 is provided and has a longitudinally extending, horizontal main portion 46 which is disposed in a plane above the coplanar upper bars of the sides 16 and the front end wall 34 and the very narrow laterally inturned rear end sections 42. The longitudinal sections 46 have front depending portions 48, which are vetrically disposed and which are fixed, in any suitable fashion, to the top bar of the corresponding half front sections 22, adjacent the side walls 16. The horiozntal or longitudinally extending main portions 46 serves as guides for the upper section 38 of the tailgate or rear end wall assembly 36. In this respect, the upper section 36 is composed of opposing side bars 50 having upper lateral ends 52 and having lower ends, which are hingedly and pivotally associated with the lower section 40 and with a guide means, as will be explained. The opposing side bars 50 are connected by spaced apart crossbars 54. The lower section 40 is composed of opposing side bars 56, which are connected by spaced apart transverse bars 58, so that the upper and lower sections 38 and 40 are very similar in appearance and are very similar to the fixed sides and fixed front end wall in that in the vertical position of the tailgate assembly, the crossbars are vertically spaced apart in a similar fashion.

The laterally inturned rear sections 42 are welded or otherwise secured to rigid upstanding angle irons 60 extending vertically therealong. The vertical rear end sections 62 of the guide bars 44, whose upper ends are connected to the rear ends of the longitudinal horizontal sections 46 by arcuate downwardly curved rear end portions 64 of the sections 46, includes rear faces 66 which cooperate with the flanges 68 of the angle irons or sections 64 of the sections 46, include rear faces 66 which of the side walls and the short end walls 42 to provide guide channels 70 which serve as a means for guiding the tailgate or rear wall assembly 36 in its upward and downward movements.

The laterally offset upper ends 52 of the side bars 50 of the upper section 36 are pivotally attached by pivot pins 72 to depending arms 74 on sleeves or guide tubes 76 freely slidable on the longitudinal or horizontal sections 46 of the guide bars 44.

An angle guide member, which is in the form of an angle strap 78 is attached to each of the side bars 50 at its flange 80 and has a free flange 82, which slides on the outer side face of the corresponding guide bar 44, both the longitudinal sections 46 and the vertical sections 62 thereof, so as to stabilize the upper section 38 of the end wall or tailgate assembly 36 in its raising and lowering movements. Further, the free flanges 82 are operable to abut the upper surface portions of the rear ends of the uppermost bars 18 to limit downward movement of the end wall assembly 36.

As shown in FIGURE 6, the uppermost crossbar 84 of the lower section 40 of the hinged rear end wall or tailgate assembly 36 is attached to the immediately adjacent crossbar 86 of the lower section 40 of the end wall assembly 36 by a rigid bar 88 at each side for stabilization purposes. The opposing ends of the crossbar 84 are provided with axial bores 90 within which pins 92 are freely disposed at one end, the opposing ends of the pins being freely socketed in lateral projections 94 which are inturned and are provided on the lower ends of the side bars 50 of the upper section 38. Thus, the side bars 50 are free to pivot on the bar 84, which constitutes the upper bar of the lower section 40. By virtue of this and the pivot pins 72, the upper section can be freely pivoted or hinged into an angular position, as shown in FIGURE 2, while the lower section 40 remains in a perpendicular position.

The laterally inturned ends 94 are provided with tubular guides 96, which are welded thereto, as at 98, and project laterally therefrom so that they have outer ends 100 which are free to ride or slide in the slide or guide channels 70. In a similar fashion, the lowermost bar 102 of the lower section 40 is formed with opposite end tubular guides 104, which are welded thereto, as at 106 and which have laterally projecting ends 108 that are free to slide in the channels 70.

It can thus be seen that, assuming the sections 38 and 40 of the end wall 36 to be in vertical alignment and in a lowered perpendicularly orientated closed position, parallel with the fixed front wall 34, the end wall or tailgate can be easily raised, without undue manual exertion by one person, by moving the upper section 38 inwardly and upwardly. The upper section 38 will pivot about the pivots 72 while the sleeves 76 slide forwardly on the guides 46 and the lower end of the upper section 38 will pivot about the trunnions or pins 92, thereby enabling the lower section to remain in a vertical position and to move vertically upwardly, while the upper section slides forwardly at an angle. When the lower section 40 has been raised, it can be seen that, due to the pivotal arrangement of the pins or trunnions 92, as shown in detail in FIGURE 6, the guide 96 can slide out of the upper end of the channels 70 and onto the upper face of the guide bar 46 and that the lower guides 104 will follow and the outer ends 108 thereof will leave the upper ends of the channels and slide onto the upper faces of the guide bars 46. The entire end wall or end gate will then be in a horizontal position and will be supported by the guide bars 46, with the sleeves 76 being in a forwardmost position and the outer guide ends 100 and 108 of the guide elements 96 and 104 resting on the upper faces of the guide members 46. In such position, the flanges 82 of the bracing angle irons will engage the outer side faces of the guide members 46.

Reversing the operation, it can be seen that the lower section can start downwardly, with the lowermost guides 104 having their outer ends 108 enter the upper open ends of the guide channels 70 and the upper section 38 of the end gate assuming an articulated position and pivoting about its two pivot points and following the lower section until the two sections are in vertical alignment and are in perpendicular position, parallel to the front wall 34.

The upper ends of the angle irons are provided on their outermost flanges with square sockets 110 to receive the square depending ends 112 of a rigidifying crossbar 114 with the ends being socketed in the sockets so as to secure the crossbar in place, without any mechanical means, and thereby rigidify the rear end of the conversion rack.

Thus, the conversion arrangement is made up of three elements, namely, the sides having laterally inturned front end portions which are releasably affixed together to form the front wall and connect the side walls together and the upwardly acting tailgate.

It will be noted that all of the corners are rounded so that a canvas or the like cover can be secured over the assembled rack construction.

What is claimed as new is as follows:

1. For use with the open load supporting body of a truck, an upward acting rear tailgate or end wall assembly comprising horizontally disposed guide members extending longitudinally of the body and positioned parallel with the sides of the body, said guide members having depending rear end portions, vertical guide means structurally associated with said rear end portions and disposed perpendicular to the bottom of the load supporting body, a sectional end wall having at least an upper and a lower section having hingedly connected adjoining portions, said sections having opposing side portions, support means carried by said sections and slidably disposed in relation to the guide members, means pivotally connecting the opposing side portions of the upper section adjacent its upper end to the guide members for pivotal movement thereon about an axis transverse to the longitudinal axis of the sides of the load supporting body, means hingedly connecting the lower and upper portions of the upper and lower sections together for movement of the upper section from a vertical position into an inclined position relative to the vertically retained lower section in the raising of the end wall, guide elements projecting outwardly laterally from and beyond the opposing side portions of the sections adjacent the hinged ends thereof and slidably disposed in the vertical guide means, guide elements projecting laterally from and beyond the opposing side portions of the lower section adjacent its lower end, said guide elements being adapted to slide upwardly in the guide means as the end wall is raised and the sections break about the hinge means and then to ride on the horizontal guide members to dispose the end wall in a horizontal position supported entirely on the guide members, said support member being constituted by a sleeve freely slidable on each horizontal portion of each of the guide members and having a depending arm portion, said upper section of the end wall having opposing side members having offset portions with the means pivotally connecting the offset portions to the depending arm members.

2. In combination with a truck of the type having a load bed including vertically short upstanding opposite sides interconnected at one pair of corresponding ends by means of a vertically short upstanding end side, a side and end wall extension assembly including a pair of opposing sidewalls having integral laterally inwardly directed end wall sections at one pair of corresponding ends removably joined at their adjacent ends forming an end wall for said extension assembly rigidly interconnecting said one pair of corresponding ends of said sidewalls, said side and end walls being attached to and forming upward extensions of said opposite and end sides, respectively, the other pair of corresponding ends of said sidewalls including laterally inwardly directed partial end walls spaced apart at their adjacent ends defining an opening therebetween, a closure gate for said opening and removably positionable in positions supported from said sidewalls and closing said opening, said adjacent ends of said partial end walls including generally parallel vertically extending end members whose upper ends curve smoothly toward said end wall and terminate in horizontal portions thereof extending from the inner ends of said partial end walls toward and secured, at their free end portions, to corresponding upper portions of said end wall sections inwardly from the corresponding side walls.

3. The combination of claim 2 wherein each of said partial end walls includes upstanding means spaced outwardly of, generally paralleling and cooperating with the outer faces of said end members defining upstanding channels opening toward each other, said closure gate including upper and lower sections pivotally secured together at their lower and upper marginal edge portions, respectively, for relative oscillation about a horizontal axis and opposite side vertically spaced and outwardly projecting upper and lower elongated guide members disposed adjacent the upper and lower marginal edge portions of said lower section and having free end portions endwise insertable and slidingly received in said channels for guided movement therealong, a pair of followers slidingly engaged with said horizontal portions of said end members for guided movement therealong, the opposite sides of said upper section including laterally directed members whose outer free ends are pivotally secured to said followers for oscillation relative thereto about aligned horizontal transverse axes.

4. The combination of claim 3 wherein the last-mentioned axes are spaced below said horizontal portions of said end members a distance generally equal to the effective lateral displacement of said axes from said upper end section of said closure gate.

5. The combination of claim 4 wherein said followers are shiftable along said horizontal portions to the forward ends thereof a distance sufficient to cause said guide members to slide upwardly through said channels and out of the upper ends thereof, over the curved upper extremities of said end members and onto said horizontal portions of said end members with the guide members adjacent the lower marginal edge portion of said lower gate section spaced along said horizontal portions toward said end wall from said curved upper extremities.

6. The combination of claim 2 wherein said sidewalls include vertically spaced longitudinally extending members curved smoothly laterally inwardly at said one set of corresponding ends of said sidewalls to form said end wall sections and curved smoothly laterally inwardly at the other set of corresponding ends of said sidewalls to form said partial end walls, the inwardly directed ends of said vertically spaced longitudinally extending members forming said partial end walls being secured to said end members at their inner extremities.

7. For use with a truck of the type having a load bed including vertically short upstanding opposite sides interconnected at one pair of corresponding ends by means of a vertically short upstanding end side, a side and end wall extension assembly including a pair of opposing sidewalls joined by an end wall at one pair of corresponding ends of said sidewalls extending therebetween, said side and end walls being adapted for attachment to and to form upward extensions of said opposite and end sides, respectively, the other pair of corresponding ends of said sidewalls including laterally inwardly directed partial end walls spaced apart at their adjacent ends defining an opening therebetween, a closure gate for said opening and removably positionable in position supported from said sidewalls and closing said opening, said adjacent ends of said partial end walls including generally parallel vertically extending end members whose upper ends curve smoothly toward said end wall and terminate in horizontal portions thereof extending from the inner ends of said partial end walls toward and secured at their free end portions to corresponding upper portions of said end wall sections spaced inwardly from the corresponding sidewalls, each of said partial end walls including upstanding means spaced outwardly of, generally paralleling and cooperating with the outer faces of said end members defining upstanding channels opening toward each other, said closure gate including upper and lower sections pivotally secured together at their lower and upper marginal edge portions, respectively, for relative oscillation about a horizontal axis and opposite side vertically spaced and outwardly projecting upper and lower elongated guide members disposed adjacent the upper and lower marginal edge portions of said lower section and having free end portions endwise insertable and slidingly received in said channels for guided movement therealong, a pair of followers slidingly engaged with said horizontal portions of said end members for guided movement therealong, the opposite sides of said upper section including laterally directed members whose outer free ends are pivotally secured to said followers for oscillation relative thereto about aligned horizontal transverse axes.

8. In combination with a truck of the type having a load bed including vertically short upstanding opposite sides interconnected at one pair of corresponding ends by means of a vertically short upstanding end side, a side and end wall extension assembly including a pair of opposing sidewalls having integral laterally inwardly directed end wall sections at one pair of corresponding ends removably joined at their adjacent ends forming an end wall for said extension assembly rigidly interconnecting said one pair of corresponding ends of said sidewalls, said side and end walls being attached to and forming upward extensions of said opposite and end sides, respectively, the other pair of corresponding ends of said sidewalls including laterally inwardly directed partial end walls spaced apart at their adjacent ends defining an opening therebetween, a closure gate for said opening and removably positionable in positions supported from said sidewalls and closing said opening, an overhead horizontally disposed and transversely extending brace member removably secured at its opposite ends to the upper inner corner portions of said partial end walls and disposed above said closure gate when the latter is in its closed position.

References Cited

UNITED STATES PATENTS

| | | | |
|---|---|---|---|
| 2,193,287 | 3/1940 | Lewis et al. | 52—663 X |
| 2,801,130 | 7/1957 | Booker | 296—106 X |
| 2,284,927 | 6/1942 | Speed | 52—663 X |
| 2,805,885 | 9/1957 | Elzea | 296—36 |

BENJAMIN HERSH, Primary Examiner.

J. A. PEKAR, Assistant Examiner.

U.S. Cl. X.R.

160—201; 296—50